June 15, 1948.　　　G. A. TINNERMAN　　　2,443,362
FASTENING DEVICE
Filed March 31, 1947
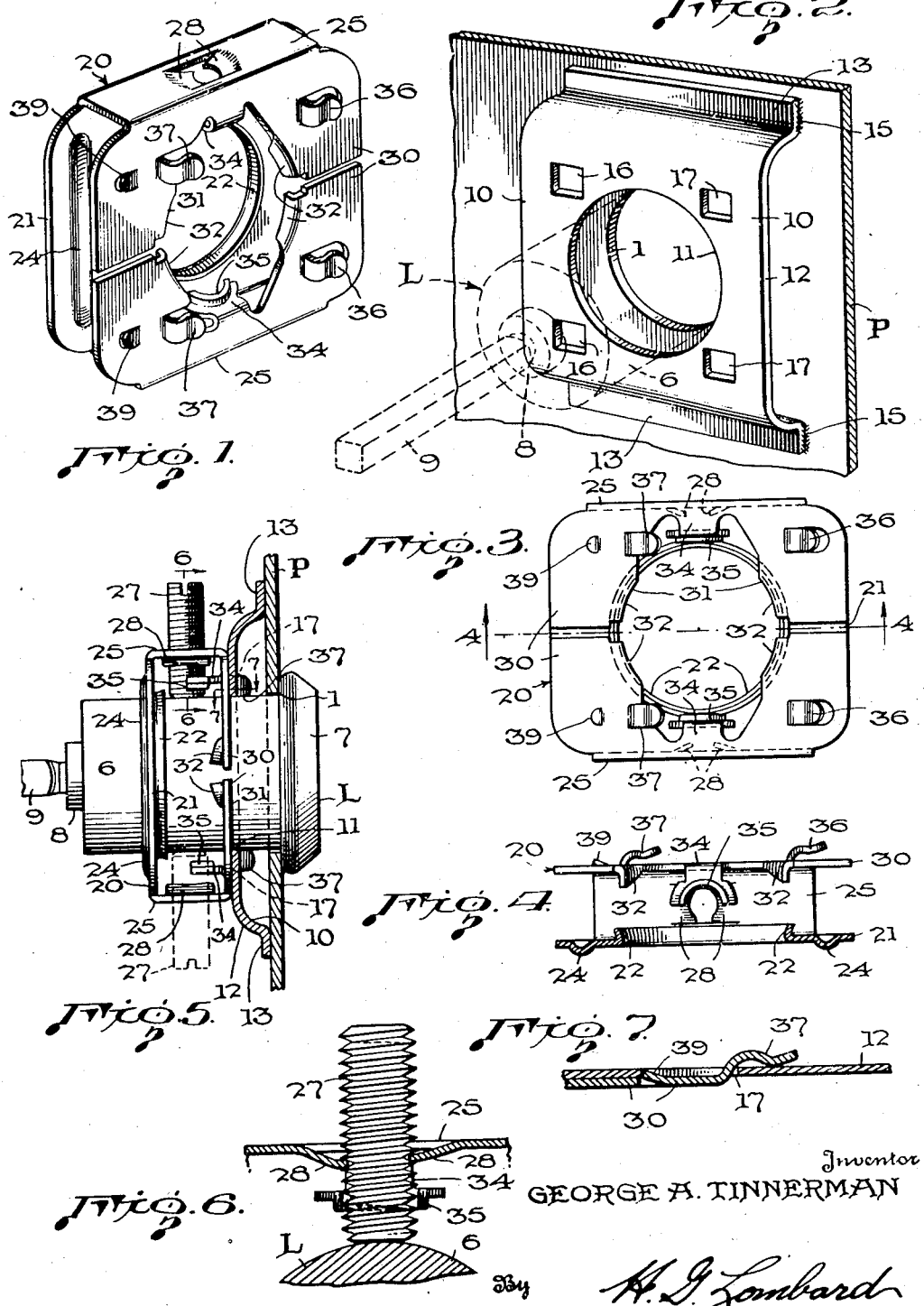
Inventor
GEORGE A. TINNERMAN
By H. J. Lombard
Attorney Patented June 15, 1948

2,443,362

UNITED STATES PATENT OFFICE 2,443,362

FASTENING DEVICE

George A. Tinnerman, Cleveland, Ohio, assignor to Tinnerman Products, Inc., Cleveland, Ohio, a corporation of Ohio Application March 31, 1947, Serial No. 738,266

12 Claims. (Cl. 70—370)

1

This invention relates in general to door lock installations and the like, and deals, more particularly, with improvements in the mounting of a door cylinder lock of the type widely used for locking the doors of automotive vehicles and various cabinet structures of general utility, for example.

The invention has for a primary object the provision of an improved mounting for a door cylinder lock, or similar object comprising a light weight, inexpensive sheet metal device which is formed in a reinforced strong and durable, plate-like retainer adapted to receive the barrel or body of the cylinder lock and to secure the same firmly and rigidly in any required position of adjustment in a completed mounting.

A further object of the invention is to provide such a mounting for a door cylinder lock, or the like, in which the sheet metal retainer embodies mounting means for the cylinder lock combined with means for attaching the retainer to the door frame supporting panel or other supporting part.

Another object is to provide an improved mounting of the kind described in which the securing means of the retainer comprises a set screw device threadedly engaged in integral thread means provided in the retainer in such a way as to permit the set screw to be easily and quickly actuated in the completion of an installation in a minimum of time and effort.

A more specific object of the invention is to provide the improved mounting of the invention with a retainer embodying all the foregoing features of construction and which comprises a one-piece sheet metal device that is strong and durable, and is manufactured at relatively low cost from standard sheet metal strip stock with a minimum loss or waste of material.

An additional object of the invention is to provide the described mounting for a door cylinder lock, or similar body, in which the retainer is designed for attachment to a separate adapter device that serves to reinforce the mounting and otherwise permits the mounting to be installed in locations where the supporting part is irregular in shape and other than a plane surface in the area of the mounting.

Further objects and advantages of the invention and other new and useful features in the construction, arrangement and combination of parts thereof will be readily apparent as the following description proceeds with reference to the accompanying drawings, for purpose of illustration but not of limitation, in which like reference characters designate like parts throughout, and in which:

Fig. 1 is a perspective view of the retainer per se;

Fig. 2 is a perspective view of the rearward side of the mounting area of a door panel or other support showing the arrangement of the adapter as secured to the door panel in position for receiving the door cylinder lock, represented in dotted lines;

Fig. 3 is a bottom plan view of the retainer per se;

Fig. 4 is a sectional view of the retainer shown in Fig. 3, taken along line 4—4, looking in the direction of the arrows;

Fig. 5 is a side elevational view of a completed mounting of a door cylinder lock, according to the invention, with the adapter and door panel or other support represented in section;

Fig. 6 is a sectional view taken on line 6—6 of Fig. 5 looking in the direction of the arrows and showing the action of the set screw means for securing the barrel or body of the cylinder lock in a completed installation; and, Fig. 7 is a sectional view on line 7—7 of Fig. 5, looking in the direction of the arrows, and showing one of the integral clip means on the retainer for attaching the same to the adapter.

Referring now, more particularly, to the drawings, Fig. 5 illustrates a typical installation for mounting a door cylinder lock, or the like, in accordance with the invention by employing the retainer shown in Figs. 1, 3 and 4 in conjunction with an adapter, Fig. 2, attached to a door panel P or other support. The door panel P may be of any suitable metal, wood or fibre board construction but usually is in the form of a sheet metal panel, as shown, and provided with an opening 1 for receiving the barrel or body 6 of the cylinder lock L, or the like, in the area in which the lock is to be installed. The door cylinder lock L, is of a conventional type which comprises a barrel or body 6 having an outer annular, peripheral flange 7 and a key passage in an inner cylinder 8 connected to a spindle 9 controlling the door latching or bolting mechanism. An adapter 10 having a central opening 11 corresponding to the opening 1 in the panel P, is secured to the rearward side of the panel P with said openings in aligned relation.

The adapter 10 preferably is a plate-like, sheet metal member defining a base 12 having offset end flanges 13 which are secured to the panel or other support in a manner whereby said base 12 is spaced from the adjacent rearward surface of the panel. Any suitable securing means may be employed for this purpose and, in the present example in which the support is a sheet metal panel, the end flanges 13 of the adapter are secured thereto by spot welding 15, Fig. 2. The adapter may be secured to the panel in an equivalent manner by screws, bolts and nuts, rivets, staples, or other fastening means, particularly in instances where the panel P is of wood or fibre board construction. In any case, the adapter 10 is secured to the panel P, with the base portion 12 spaced therefrom and with the opening 11 therein aligned with the opening 1 in the panel in order to receive and support door cylinder lock unit L, as illustrated in dotted lines in Fig. 2. The adapter is provided with pairs of spaced assembling slots 16 and 17 which are identical and substantially equally spaced about the central opening 11 therein.

The retainer, designated generally 20, Figs. 1, 3 and 4, is a substantially rectangular, plate-like, box type of device which is formed in one-piece from a single section of standard sheet metal strip material, preferably spring metal, such as spring steel or cold rolled steel having spring characteristics. The middle portion 21 of the strip defines the top wall of the retainer and is provided with a central opening having an inwardly bent annular rim 22, and preferably outwardly pressed elongate ribs 24 to strengthen and rigidify the same. Portions 25 of reduced width adjacent the top wall 21 are bent generally normal thereto in the same direction to define the side walls 25 of the retainer. End portions 30 of equal size are return bent inwardly toward each other to define the bottom wall of the retainer.

The side walls 25 are provided with bolt or screw thread engaging means for threadedly engaging a set screw 27 applied to either of said side walls 25, to effect a clamping action on the lock cylinder barrel 6 to maintain the same in mounted position substantially as shown in Figs. 5 and 6. Such thread engaging means may be provided in any suitable manner, but preferably are in the form of integral cooperating tongues 28 which are struck from the sheet metal material of the side walls 25 and so formed that the extremities thereof lie on a helix corresponding substantially to the thread of the set screw 27 for uniform threaded engagement therewith.

The thread engaging elements 28 are best provided from the sheet metal material of the side walls 25 by an aperture intermediate spaced parallel slits, which form cooperating tongues, or the like, having spaced extremities defining the desired thread or thread opening corresponding substantially to the root diameter of the set screw for threadedly engaging the thread thereof. Said tongues 28 otherwise are preferably formed to project inwardly out of the plane of the wall 25 and are bent lengthwise in substantial ogee formation to provide the maximum possible strength to withstand the tightening action of the set screw 27 as it is advanced to final applied fastening position.

Such thread engaging means may be pressed, stamped, extruded, or otherwise provided in any suitable form or construction so long as the same threadedly engage with the thread of the set screw and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues 28 as shown, are the most efficient and the most practical in that they are possessed of unusual inherent strength and will not collapse or pull through when the set screw is tightened, nor loosen under continuous strain and vibration in the installation. This takes place by reason of the fact that the sheet metal material from which such tongues are formed is of less thickness than the pitch or spacing between adjacent thread convolutions of the set screw, wherefore the extremities of said tongues tend, more effectively, to move toward each other and bite into the grooves intermediate adjacent thread convolutions when the screw is tightened, and otherwise become embedded in the root of the set screw in locked, frictional fastening engagement therewith in applied fastening position. There is thereby eliminated the necessity for a separate, auxiliary locking means such as a lock nut or lock washer and this, in mass production, makes possible a considerable saving not only in the cost of such locking devices, but also, in the expense and labor involved in the tedious, time consuming assembling operations and other added steps in manufacture which such auxiliary locking means require. It is to be understood, however, that the present invention is not limited in any manner or form to the illustrated construction of the thread engaging means 28 but rather, comprehends also, various other similar and related forms of such tongues or equivalent thread engaging elements.

The bottom wall 30 of the retainer which is formed by the end portions of the retainer blank is provided with cut out areas in said end portions defining an opening 31 in registration with the rim opening 22 in the top wall of the retainer. Preferably said opening 31 is bordered by inwardly extending bearing shoulders 32 designed for surface contact with the barrel 6 of the door cylinder lock or other body in order to engage the same firmly and rigidly. Between the bearing shoulders 32 and at substantially diametrically opposed points in the opening 31 in the bottom wall 30, there are provided integral stud supporting arms 34 bent inwardly and terminating in arcuate lips 35. These lips preferably include thread elements on the inner surfaces thereof and are aligned with the respective thread openings defined by the tongues 28 in the retainer side walls 25, and are thereby adapted to engage and support the leading end portion of said set screw 27 in a thread locking action when tightened in clamping relation to the barrel of the cylinder lock as shown in Fig. 5.

Around the opening 31 in the bottom wall 30 of the retainer, there are provided in predetermined position, pairs of spaced hooks 36 and 37, having a size and spacing corresponding to the pairs of assembling slots 16 and 17, respectively, in the base 12 of the adapter, Fig. 2. Said hooks 36, 37 are adapted to be received in the assembling slots 16 and 17 in the initial step of attaching the retainer to the adapter, and thereafter moved laterally to clasp portions of the adapter adjacent said slots, as illustrated in Fig. 7. This takes place when the retainer is moved laterally to its fully attached position in which the aligned openings 31 and 22 therein are in registration with the opening 11 in the base 12 of the adapter. To this end, the said pairs of spaced hooks 36 and 37 are provided on the retainer in equally offset relation to the opening 31 in the bottom wall 30 of the retainer so that the said opening 31 will be in registration with the opening 11 in the adapter upon lateral movement of the retainer and the hooks 16 and 17 thereon to fully attached position, as aforesaid.

In order to lock the retainer in attached position on the adapter, the rearward pair of spaced hooks 37 are provided with cooperating locking detent elements 39 which are adapted to snap into the assembling slots 17, and engage the adjacent edge portions of said slots as seen in Fig. 7, to lock the hooks in applied clasping position and thereby prevent any lateral movement or shifting of the retainer in the direction toward disconnection of the retainer from attached position on the adapter 10. Said locking detents may be provided in association with each of the hooks 16, 17, if desired, but need be provided only for the rearward hooks 37 inasmuch as these hooks are the first which must become released in detaching the retainer, and, accordingly, so long as the detents 39 lock these rearward hooks 37 in applied position, the forward hooks 36 are also locked in applied position at the same time. Consequently, when the retainer is once assembled in fully attached position on the adapter, the four hooks 36, 37, which are received in the assembling slots 16, 17, respectively, and the locking detents 39 which are also received in the slots 17 in cooperation with the hooks 37, positively lock the retainer in attached position against accidental removal or displacement. The arrangement otherwise is such that the connected retainer and adapter provide a unitary mounting yoke which is immovably united to the door panel or other support by the spot welding 15, Fig. 2, whereupon the cylinder lock may be firmly and rigidly mounted by the set screw 27 in the completed installation as shown in Fig. 5.

In the application and use of the invention, it will be understood that the adapter 10 is secured to the door panel by any suitable means, as by spot welding 15, Fig. 2, with the opening 11 therein in registration with the passage 1 in the door panel. In mass production methods of assembly, the doors or other panels P provided with such adapters are prepared in numbers ready for use on an assembly line, for example.

The retainer 20 is attached to the adapter 10 either prior to or after the adapter is secured to the door panel, as aforesaid, and this operation is easily and quickly effected simply by inserting the pairs of hooks 36 and 37 in the pairs of assembling slots 16 and 17, respectively, and then pushing the retainer in the direction of the free ends of the hooks until said hooks are in clasping engagement with the inner face portions of the adapter adjacent said assembling slots. The hooks 36, 37, thereby hold the retainer in attached position at four spaced points in cooperation with the bottom wall 30 of the retainer which is in engagement with the outer face of the adapter. In such fully attached position of the pairs of hooks 36 and 37, the locking detents 39, Fig. 7, which are associated with the rearward pair of hooks 37, snap into the associated slots 17 and engage the edge surfaces of said slots in the manner of abutments acting in opposition to withdrawal of the associated tongues 37. The retainer 20, accordingly, is locked in attached position on the adapter 10 in such a way that there is little possibility of the retainer becoming displaced or accidentally removed from its proper applied position during handling, moving or shipping of the assembly preparatory to the final operation of mounting the cylinder lock in the completed installation. Thus, on an assembly line, it is more or less certain that when a retainer is once correctly attached to the adapter, it will subsequently be found in proper position at the next assembly station in readiness for the final operation of mounting the door cylinder lock in the completed assembly.

The opening 1 in the panel P, and the aligned opening 11 in the base 12 of the adapter which is spaced from said panel, present spaced bearing surfaces which are adapted to snugly receive the body or barrel 6 of the cylinder lock, as shown in Figure 5, and to support the same firmly and rigidly at spaced points. In the final assembly, the cylinder lock L, accordingly, is easily and quickly installed with the flange 7 bearing on the outer surface of panel P and the body or barrel 6 thereof extending through the spaced, aligned openings 1 and 11 in the panel and adapter, respectively, and through the opening 31 in the bottom wall of the retainer and the opening defined by the annular rim 22 in the top wall of the retainer. In such applied position, the bearing shoulders 32 on the bottom wall of the retainer frictionally engage the body 6 of the cylinder lock while the annular rim 22 snugly supports said body 6 at the approximate median portion thereof.

The set screw 27 may then be applied to the thread engaging elements 28 in either of the side walls 25, depending on which position the set screw is most easily accessible in the complete installation. In mass production methods of assembly, this, of course, is predetermined, and accordingly, the set screw 27 is preferably assembled with the retainer prior to attachment of the retainer to the adapter, as aforesaid, with the set screw 27 in either position represented by the full or dotted lines in Fig. 5. In any case, the set screw is threaded with the elements 28 and is rotated into tightened clamping engagement with the body or barrel 6 of the cylinder lock, Figs. 5 and 6. In such clamping relation of the set screw, the inwardly extending arm 34 prevents displacement or flexing of the set screw and thereby supports the same in positive clamping engagement with said body or barrel 6 of the cylinder lock. The thread element on the inner surface of the arcuate lip 35 carried by said arm 34 effects a thread locking action on the set screw to minimize possible loosening thereof from fully applied clamping position, and this, together with the thread locking action provided by the tongues 28, as aforesaid, positively locks the set screw in tightened clamping position against accidental or unintended loosening under the most severe conditions of vibratory motion or shock.

Although the invention is described in connection with a mounting for a cylinder lock, it is to be understood that the improved construction in general is equally applicable to other similar applications and uses in the mounting of door handles, and various structural members embodying sleeves, bushings and like bodies within the broad general scope and basic teachings of the instant disclosure.

The retainer preferably is constructed of relatively thin sheet metal, the thickness of which is selected according to service requirements and the predetermined size of the barrel of the cylinder lock, or the sleeve, bushing or similar body of any other part to be mounted in accordance with the invention. The retainers are most effective when provided of spring metal suitably tempered and treated to give the desired toughness and hardness particularly in the area of the integral thread engaging tongues 28 which must be capable of withstanding the pronounced tightening force of the set screw in clamping engagement with the barrel of the cylinder lock, as shown in Fig. 5. A cheap but effective retainer may be provided from cold rolled metal such as cold rolled steel, which is untempered but of a spring metal nature and capable of providing an effective and reliable installation adapted for a long period of satisfactory service and use.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A mounting comprising a supporting part having an opening, an article comprising a body received in said opening, an adapter united to said supporting part having an opening receiving said body and an assembling recess, a retainer having an opening also receiving said body and provided with a hook received in said assembling recess to attach the retainer to the adapter, and means supported by said retainer exerting a clamping action on said body to maintain the same in mounted position.

2. A mounting comprising a supporting part having an opening, an article comprising a body received in said opening, an adapter united to said supporting part having an opening receiving said body and an assembling recess, a retainer having an opening also receiving said body and provided with a hook received in said assembling recess to attach the retainer to the adapter, and a screw supported by said retainer exerting a clamping action on said article body to maintain the same in mounted position.

3. A mounting comprising a supporting part having an opening, an article comprising a body received in said opening, an adapter united to said supporting part having an opening receiving said body and a pair of spaced assembling slots on either side of said opening therein, a retainer having an opening also receiving said body and provided with spaced hooks received in said spaced assembling slots to attach the retainer to the adapter, and means supported by said retainer exerting a clamping action on said article body to maintain the same in mounted position.

4. A mounting comprising a supporting part having an opening, an article comprising a body received in said opening, an adapter united to said supporting part having an opening receiving said body and a pair of assembling slots on either side of said opening therein, a sheet metal retainer having an opening also receiving said body and provided with spaced hooks received in said assembling slots to attach the retainer to the adapter, and a screw threadedly engaged in a thread opening in said retainer exerting a clamping action on said article body to maintain the same in mounted position.

5. A mounting comprising a supporting part having an opening, an article comprising a body received in said opening, an adapter comprising a sheet metal plate united to said supporting part, said adapter having an opening receiving said body and a pair of spaced assembling slots on either side of said opening, a retainer comprising a sheet metal device defining a pair of spaced walls having aligned openings also receiving said body, spaced hooks on one of said walls of the retainer received in said spaced assembling slots in the adapter to attach the retainer to the adapter, and a screw threadedly engaged in a thread opening in said retainer and exerting a clamping action on said body to maintain the same in mounted position.

6. A mounting comprising a supporting part having an opening, an article comprising a body received in said opening, an adapter comprising a sheet metal plate defining a base and offset flanges united to said supporting part with said base spaced from said supporting part, said base of the adapter being provided with an opening receiving said body and a pair of spaced assembling slots on either side of said opening, a retainer comprising a sheet metal device defining spaced inner and outer walls joined by an intermediate side wall, said inner and outer walls of the retainer having aligned openings also receiving said body and said inner wall having complementarily spaced hooks received in said spaced assembling slots in the adapter to attach the retainer to said adapter, and a screw threadedly engaged in a thread opening in said side wall of the retainer and exerting a clamping action on said body to maintain the same in mounted position.

7. A mounting comprising a supporting part having an opening, an article comprising a body received in said opening, an adapter comprising a sheet metal plate defining a base and offset flanges united to said supporting part with said base spaced from said supporting part, said base of the adapter being provided with an opening receiving said body and a pair of spaced assembling slots on either side of said opening, a retainer comprising a sheet metal device defining spaced inner and outer walls joined by an intermediate side wall, said inner and outer walls of the retainer having aligned openings also receiving said body and said inner wall having spaced hooks received in said spaced assembling slots in the adapter to attach the retainer to said adapter, at least one of said hooks having a cooperating detent receivable in the associated assembling slot to lock said hook against withdrawal from attached position therein, a thread opening in said side wall and a screw threadedly engaged in said thread opening and exerting a clamping action on said body to maintain the same in mounted position.

8. A mounting comprising a supporting part having an opening, an article comprising a body received in said opening, an adapter comprising a sheet metal plate defining a base and offset flanges united to said supporting part with said base spaced from said supporting part, said base of the adapter being provided with an opening receiving said body and a pair of spaced assembling slots on either side of said opening, a retainer comprising a sheet metal device defining spaced inner and outer walls joined by an intermediate side wall, said inner and outer walls of the retainer having aligned openings also receiving said body and said inner wall having a pair of spaced hooks on either side of the opening therein received in said spaced assembling slots in the adapter to attach the retainer to said adapter, at least one of said hooks having a cooperating detent receivable in the associated assembling slot to lock said hook against withdrawal from attached position therein, said side wall of the retainer being provided with thread engaging means comprising a pair of integral cooperating tongues struck from the material of said side wall and bent inwardly thereof, and a screw threadedly engaged with said tongues and exerting a clamping action on the article body to maintain the same in mounted position.

9. A fastener comprising a sheet metal body bent to provide a pair of spaced walls and an intermediate side wall, said spaced walls having aligned openings for receiving an article to be secured, and said side wall being provided with an opening for receiving a bolt passed through said opening to extend between said spaced walls into clamping engagement with said article, and means on one of said walls for attaching the fastener in an installation.

10. A fastener comprising a sheet metal body bent to provide a pair of spaced walls and an intermediate side wall, said spaced walls having aligned openings for receiving an article to be secured, and said side wall being provided with an opening for receiving a bolt passed through said opening to extend between said spaced walls into clamping engagement with said article, and means comprising a hook on one of said spaced walls for attaching the fastener in an installation.

11. A fastener comprising a sheet metal body bent to provide a pair of spaced walls and an intermediate side wall, said spaced walls having aligned openings for receiving an article to be secured, and said side wall being provided with an opening for receiving a bolt passed through said opening to extend between said spaced walls into clamping engagement with said article, and a pair of spaced hooks on one of said spaced walls provided on either side of the opening therein for attaching the fastener in an installation.

12. A fastener comprising a sheet metal body bent to provide a pair of spaced walls and an intermediate side wall, said spaced walls having aligned openings for receiving an article to be secured, and said side wall being provided with an opening for receiving a bolt passed through said opening to extend between said spaced walls into clamping engagement with said article, and means on one of said spaced walls for attaching the fastener in an installation comprising pairs of spaced hooks on opposite sides of the opening therein, said hooks all extending in the same general direction and defining a pair of forward attaching hooks and a pair of rearward attaching hooks, and a cooperating detent associated with each of the rearward hooks for locking said hooks in the attached position of the fastener.

GEORGE A. TINNERMAN.

REFERENCES CITED

The following references are of record in the file of this patent:

UNITED STATES PATENTS

| Number | Name | Date |
| --- | --- | --- |
| 1,462,826 | Rixson | July 24, 1923 |

FOREIGN PATENTS

| Number | Country | Date |
| --- | --- | --- |
| 824,230 | France | Nov. 3, 1937 |